(12) United States Patent
Fotin et al.

(10) Patent No.: US 9,311,705 B1
(45) Date of Patent: Apr. 12, 2016

(54) ORGAN LOCALIZATION IN BIOMEDICAL IMAGE DATA USING GRADIENT FIELDS CROSS-CORRELATION

(75) Inventors: Sergey Fotin, Nashua, NH (US); Senthil Periaswamy, Hollis, NH (US)

(73) Assignee: iCad, Inc., Nashua, NH (US)

( * ) Notice: Subject to any disclaimer, the term of this patent is extended or adjusted under 35 U.S.C. 154(b) by 0 days.

(21) Appl. No.: 13/341,528

(22) Filed: Dec. 30, 2011

(51) Int. Cl.
*G06K 9/00* (2006.01)
*G06T 7/00* (2006.01)

(52) U.S. Cl.
CPC .................................... *G06T 7/0014* (2013.01)

(58) Field of Classification Search
None
See application file for complete search history.

(56) References Cited

U.S. PATENT DOCUMENTS

| | | | |
|---|---|---|---|
| 7,620,227 | B2 | 11/2009 | Gering et al. |
| 8,036,436 | B2 | 10/2011 | Geiger et al. |
| 2006/0210158 | A1* | 9/2006 | Pekar et al. ............... 382/173 |
| 2007/0297566 | A1* | 12/2007 | Urano et al. ............... 378/65 |
| 2009/0324043 | A1* | 12/2009 | Sun et al. ................... 382/131 |
| 2010/0134517 | A1 | 6/2010 | Saikaly et al. |
| 2010/0222671 | A1* | 9/2010 | Cohen et al. ............... 600/424 |
| 2010/0329529 | A1 | 12/2010 | Feldman et al. |

OTHER PUBLICATIONS

Apolinario Jr, Antonio, Claudio Esperanca, and Luiz Velho. "A Representation of Implicit Objects Based on Multiscale Euclidean Distance Fields." Proceedings of SIACG (2002): 119-129.*

Granberg, Christoffer. Clinical evaluation of atlas based segmentation for radiotherapy of prostate tumours. Diss. Umeå University, 2011.*

Chandra, Shekhar, et al. "Automatic segmentation of the prostate in 3D magnetic resonance images using case specific deformable models." Digital Image Computing Techniques and Applications (DICTA), 2011 International Conference on. IEEE, 2011.*

Klein, Stefan, et al. "Automatic segmentation of the prostate in 3D MR images by atlas matching using localized mutual information." Medical physics 35.4 (2008): 1407-1417.*

Martin, et al., "Automated Segmentation of the Prostate in 3D MR Images Using a Probabilistic Atlas and a Spatially Constrained Deformable Model", "Medical Physics", Feb. 16, 2010, pp. 1-21, No. 1.

Dowling, et al., "Automatic Atlas-Based Segmention of the Prostate: A MICCAI 2009 Prostate Segmentation Challenge Entry", 2009.

Gubern-Merida, et al., "Atlas Based Segmentation of the Prostate in MR Images", 2009, pp. 1-7, Published in: ES.

Klein, et al., "Automatic Segmentation of the Prostate in 3D MR Images by Atlas Matching Using Localized Mutual Information", "Med. Phys.", Apr. 2008, pp. 1407-1417, vol. 35, No. 4, Publisher: Am. Assoc. Phys. Med., Published in: US.

(Continued)

*Primary Examiner* — Nirav G Patel
(74) *Attorney, Agent, or Firm* — Loginov & Associates, PLLC; William A. Loginov

(57) ABSTRACT

This invention provides a system, method and computer-readable medium for detecting and localizing organs and other regions of interest in medical image data provided by a medical imaging procedure using gradient template information with respect to an example of the imaged organ and cross-correlation techniques to generate object detection information. In an embodiment, the detection and localization process/processor receives a plurality of gradient templates and employers a template with the closest matching cross-correlation to the gradient of the organ in the medical image.

37 Claims, 7 Drawing Sheets

(56) References Cited

OTHER PUBLICATIONS

Pasquier, et al., "Automatic Segmentation of Pelvic Structures From Magnetic Resonance Images for Prostate Cancer Radiotherapy", "Int. J. Radiation Oncology Biol. Phys.", 2007, pp. 592-600, vol. 68, No. 2, Publisher: Elsevier, Inc., Published in: US.

Makni, et al., "Combining a Deformable Model and a Probabilistic Framework for an Automatic 3D Segmentation of Prostate on MRI", "Int. J Cars", 2009, pp. 181-188, No. 4, Publisher: Springer, Published in: US.

Gao, et al., "A Coupled Global Registration and Segmentation Framework With Application to Magnetic Resonance Prostate Imagery", "IEEE Transactions on Medical Imaging", Oct. 2010, pp. 1781-1794, vol. 29, No. 10, Publisher: IEEE, Published in: US.

Allen, et al., "Differential Segmentation of the Prostate in MR Images Using Combined 3D Shape Modelling and Voxel Classification", 2006, pp. 410-413, Publisher: IEEE, Published in: UK.

Zhu, et al., "Efficient Illumination Insensitve Object Tracking by Normalized Gradient Matching", "IEEE Signal Processing Letters", Dec. 2007, pp. 944-947, vol. 14, No. 12, Publisher: IEEE, Published in: US.

Toth, et al., "Integrating an Adaptive Regional Based Appearance Model With a Landmark Free Statistical Shape Model: Application to PR", "Medical Imaging 2011: Image Processing", May 21, 2011, pp. 79622V-1-79622V-12, vol. 7962, Publisher: SPIE, Published in: US.

Vikal, et al., "Prostate Contouring in MRI Guided Biopsy", "Proc. SPIE", Feb. 8, 2009, pp. 1-8, vol. 7259, Publisher: SPIE, Published in: US.

Flores-Tapia, et al., "Real Time MRI Prostate Segmentation Based on Wavelet Multiscale Products Flow Tracking", "32nd Annual International Conference of the IEEE EMBS", 2010, pp. 5034-5037, Publisher: IEEE, Published in: US.

Zwiggelaar, et al., "Semi-Automatic Segmentation of the Prostate", 2003, pp. 1108-1116, Publisher: Springer-Verlag Berlin, Published in: UK.

\* cited by examiner

ORGAN LOCALIZATION IN BIOMEDICAL IMAGE DATA USING GRADIENT FIELDS CROSS-CORRELATION

BACKGROUND

1. Field of the Invention

This application relates generally to the detection or localization of objects in biomedical image data. More particularly, this application relates to the detection or localization of complex structures, such as three-dimensional organs, in biomedical image data using cross-correlation of gradient fields.

2. Description of the Related Art

Biomedical imaging examinations provide detailed information useful for differentiating, diagnosing, or monitoring the condition, structure, and/or extent of various types of tissue within a patient's body. In general, medical imaging examinations detect and record manners in which tissues respond in the presence of applied signals and/or injected or ingested substances, and generate visual representations indicative of such responses. For example, one procedure involves employing magnetic resonance imaging (MRI) technology to produce detectable signals that can be spatially encoded in image data.

In the field of computer vision, object detection or localization is the task of finding a given object in an image or a video sequence. Object detection is valuable in biomedical imaging, where computer vision systems can automatically localize anatomical regions of interest in image data. The prostate, for example, is an excellent object detection candidate for a computer vision system. Manual delineation of the gland is a challenging task for a clinician due to the complex and irregular shape of the prostate. Further still, it is increasingly desirable to precisely target the gland. Radiation therapy, image-guided biopsy, multi-parametric MRI tissue characterization, and organ region retrieval are examples in which accurate prostate detection can play a critical role in a successful patient outcome.

While numerous semi-automatic prostate detection schemes have been described in the prior art, few fully automated schemes currently exist. One existing solution involves the use of image registration methods to detect and segment the prostate. Two papers employing such methods are described, by way of useful background, by Martin et al., "Automated segmentation of the prostate in 3D MR images using a probabilistic atlas and a spatially constrained deformable model," *Medical Physics*, 37:1579, 2010; and by Dowling et al., "Automatic atlas-based segmentation of the prostate: a MICCAI 2009 prostate segmentation challenge entry," available through the World Wide Web of the Internet at the URL address: http://na-mic.org/Wiki/images/f/f1/Dowling_2009_MICCAIProstate_v2.pdf. While these methods may be accurate, detection and segmentation are achieved at high computational cost and unacceptable processing wait times. Furthermore, these described techniques and methods obtain object registration using intensity-based information, which may be suboptimal when applied to medical images with inherent intensity invariance (e.g., magnetic resonance images).

SUMMARY

This invention overcomes disadvantages of the prior art by providing a system, method and non-transitory computer-readable medium for localizing a region of interest in a medical image of a body, that can be an organ, or gland, such as the prostate, the liver, the pancreas or any other organ that can be subjected to medical imaging techniques (e.g. MRI, CAT scan, and the like). Illustratively a gradient template or templates based upon an expected image properties of the region of interest is provided. A localization process, based upon the gradient template, identifies the region of interest and provides image data that identifies portions of the region of interest. This allows the region of interest, such as a subject organ, to be more readily identified in a larger filed of image data. The template(s) are illustratively cross-correlated with the image data to generate a resulting response image that is used to localize the region of interest. In an embodiment, the detection and localization process/processor receives a plurality of gradient templates and employers a template with the closest matching cross-correlation to the gradient of the organ in the medical image. In an embodiment, a data structure containing template gradient information on one or more organs (also termed "organ gradient templates") can be stored for use in the illustrative localization process, or in another medical image processing procedure.

In an illustrative embodiment the template gradient can be characterized by intensity invariance. Also, the gradient template can include a plurality of components that can be associated with dimensions, such as an x-dimension, y-dimension and z-dimension component. Boundary gradients with respect to an organ can be provided, which can partially bound, or substantially fully bound, the organ. Additionally, the gradient template(s) can characterize and organ at a plurality of discrete scales (e.g. 1×1, 2×2, 3×3 and/or a plurality of discrete aspect ratios (which can be defined as a discrete type of scale, e.g. 1×2, 2×3, 3×4, etc.).

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
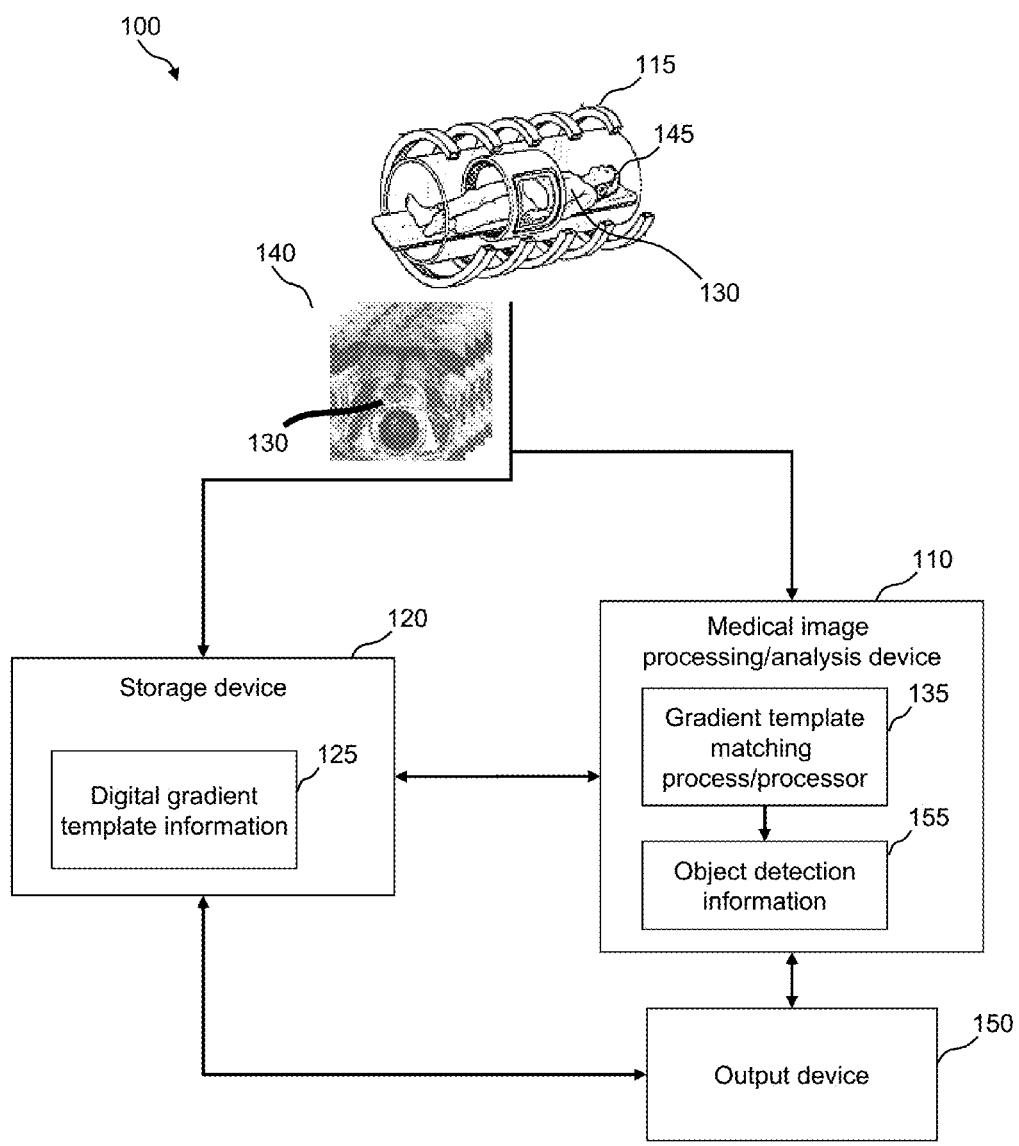
FIG. 1 is a diagram of an illustrative computer vision system that employs a storage device, an output device, and an image processing/analysis device with corresponding image processing procedures in accordance with an illustrative embodiment.

With reference to FIG. 1, there is shown a diagram of components of a computer vision or medical examination system 100 according to an illustrative embodiment of this invention. In overview, the system includes a medical image processing/analysis device 110 connected to a medical image acquisition scanner 115 and a storage device 120. The storage device includes digital gradient template information 125 of an object of interest 130 to be detected (i.e., localized) by the system. According to an illustrative embodiment of the invention, to detect an object of interest characterized by natural variation in size (see template 415 in FIG. 4), the digital gradient template information 125 can include information about the object at a plurality of discrete scales. According to further embodiments, the digital gradient template information can explicitly model natural variation in the aspect ratios of the object dimensions; that is, the height, the width, or the depth of the template could be adjusted independently. As used herein, template information can include information provided by a single template or multiple templates.

As described further below, while the depicted system 100 provides real-time or contemporaneous image data to the processing device 110 and/or storage device 120, and other system components, it is expressly contemplated that the image data processed in accordance with embodiments herein can be previously stored and that the systems processing and components can be provided free of any interconnection with a medical imaging scanner or similar image-data-generating device. In such "offline" arrangements the processed image data is previously stored on an appropriate storage medium, including, but not limited to, the storage device 120.

The medical image processing/analysis device 110 includes a gradient template matching process/processor 135 that uses the template information 125 for the runtime (as opposed to pre-computed in advance and fetched from memory/storage device) detection of the object 130 in a three-dimensional digital representation or image 140. The three-dimensional digital representation, synonymously referred to herein as a "search image" 140, can be produced by scanning a patient 145 such that the object will appear within the image. According to an illustrative embodiment of the invention, such search images and the object appearing therein can be characterized by complex variations in image brightness, in which case detection using gradient information is particularly advantageous over prior art methods that utilize intensity information. The medical image processing device can further include an output device 150 (e.g. a display, a printer, a plotter, etc.) so that object detection results can be shared with an operator.

In operation, the scanner 115 utilizes biomedical imaging technologies to create a three-dimensional medical image 140 of a body region of the patient 145 that contains a representation of the object of interest 130. By way of one example, the three-dimensional medical image can be a magnetic resonance (MR) image, the body region of the patient can be the pelvic area, and the object of interest can be the prostate. As described above, the three-dimensional medical image of the object can be either directly transferred to the medical image processing device 110 for immediate processing or transferred to the storage device 120 for processing at a later time either using an operatively interconnected system or a non-interconnected system to which the stored data is subsequently transferred after initial acquisition ad storage. The medical image processing device 110 reads the digital gradient template information 125 from storage and the gradient template matching processor 135 determines object position or localization information 155 (e.g., a three-dimensional bounding box or volume) in the search image based on comparisons of the template information to the search image.

Figure 1A:
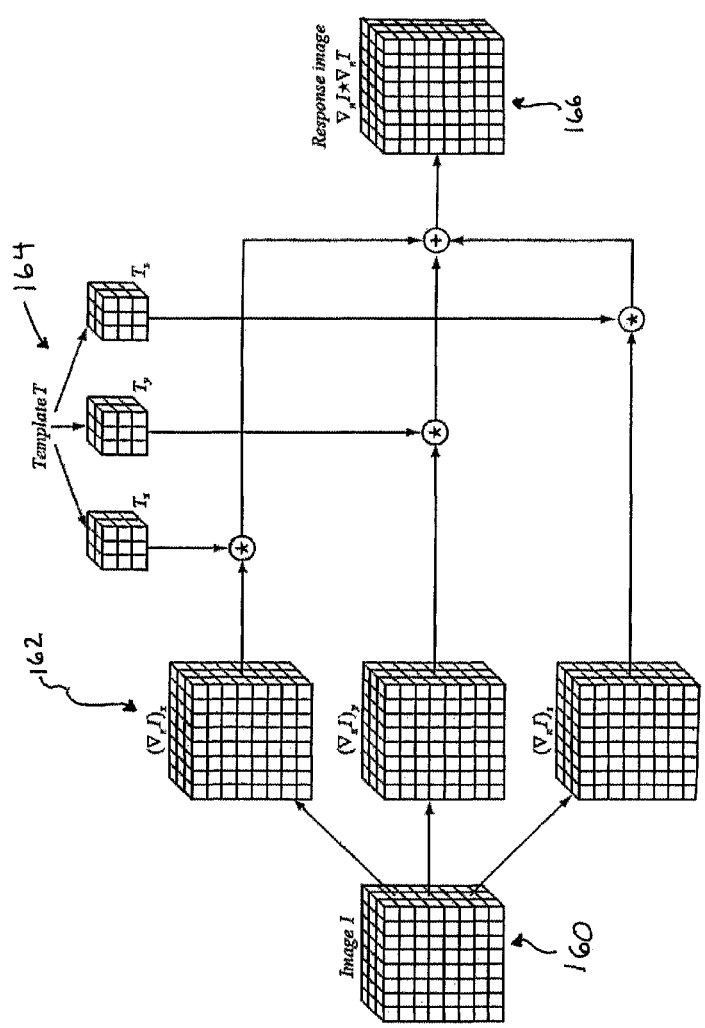
FIG. 1A is a representation of a cross-correlation procedure operating on image data, for use in conjunction with an illustrative embodiment.

According to an illustrative embodiment, the matching processor compares the template to the search image using cross-correlation of normalized gradient fields instead of original image intensities, making the method robust with respect to brightness inconsistencies common to MR imaging technology. By way of further background, and with reference to the symbolic diagram of FIG. 1A, cross-correlation of the normalized gradient field $\nabla_n I$ 160 of the image I 162 and template gradient field T 164 is the response image $\nabla_n I * T$ 166 equivalent to the sum of cross-correlations of their respective components (here and below the symbol "*" denotes cross-correlation):

$$\nabla_n I \cdot T = (\nabla_n I)_x * T_x + (\nabla_n I)_y * T_y + (\nabla_n I)_z * T_z. \qquad (1)$$

The best geometric displacement $\delta = (\delta_x, \delta_y, \delta_z)$ of the template with respect to the original image is found as the absolute maximum value of the resultant response image:

$$\delta_{best} = \arg\max_{\delta}(\nabla_n I * T)(\delta). \qquad (2)$$

After processing, the device 110 can transfer information regarding the object position information 155 to the storage device 120 and/or the output device 150. In certain embodiments, the device 110 can also execute post-processing to further refine the geometrical description of the object in the image. Post-processing can include other fully automated computer vision processes, such as initializing the shape of the object (e.g., a mean shape fitting process), refining the object shape (e.g., a graph-search based boundary detection process), localizing and segmenting parts of the object (e.g., central gland, in the example of imaging the prostate), initializing the region shape, refining the region shape, and/or post-processing the object representation to detect any regions within the object that exhibit abnormal characteristics (e.g. indicative of a suspicious malignancy). The system 100 can also include one or more input devices (e.g. a mouse, a keyboard, a touch screen, etc.) and semi-automated object refinement processes/processors (not shown in FIG. 1) that allow a system operator to provide manual control over the refinement of the object position or shape. For example, the semi-automated object refinement processes/processor can include exposing various control points around an automatically detected object boundary, enabling the operator to modify the control points, and automatically refining an object boundary in response to modifications induced by the operator. Such semi-automated object refinement processes/processors can provide useful when encountering usual cases in which the fully automated object localization/refinement processes/processors were unsuccessful in adequately capturing the true object boundary.

Exemplary Gradient Template Construction Process

The accuracy with which the gradient template matching process/processor 135 localizes the object 130 at runtime is dependent on the accuracy with which the gradient template 125 models the gradient field of the object of interest. It is recognized that the ability exists to accurately construct such a gradient template using a computer system and a training set of three-dimensional medical images containing different representations of the object. An illustrative embodiment of such a gradient template construction process 200 will now be described with reference to FIG. 2.

The gradient template construction process 200 can include an initial training set acquisition process/processor 210, in which a set of digital, three-dimensional representations of the object of interest 215, herein referred to as training medical images and synonymously referenced as $\{I_i(x, y, z)\}_{i=1,n}$, are acquired. As used herein, i refers to the index of the image and n refers to the total number of image in the training set. The training set can consist of different cases depending on the target object size range, image acquisition parameters (e.g., prostate image acquired with or without an endorectal coil), shape properties of the object of interest etc. The location of the object in each training image (not shown in FIG. 2) is provided (i.e., "annotated") by one having skill in visually recognizing the object, and can be provided in the form of volumetric coordinates such as a bounding box or volume of any acceptable regular or irregular geometric shape, which fully and tightly encompasses the object. This information separates each representation of the object of interest from the representation of the body region.

Next, a training set object alignment process/processor 220 can be executed so that all annotated objects in the training set are aligned within a single frame of reference. An output from such a process is a set 225 of aligned digital representations of the object. Illustrative details for performing such a step can include translating and rescaling each object location or region to fit a discrete rectangular box B, centered at zero, and having base pixel size $l=(l^x, l^y, l^z)$:

$$B_i(x, y, z) = I_i\left(\frac{d_i^x}{l^x}x + c_i^x, \frac{d_i^y}{l^y}y + c_i^y, \frac{d_i^z}{l^z}z + c_i^z\right), \quad (3)$$

where $c_i=(c_i^x, c_i^y, c_i^z)$ and $d_i=(d_i^x, d_i^y, d_i^z)$ respectively represent the centroid and dimension vectors of the smallest rectangular box having edges parallel to the image coordinate axes and fully encompassing the volume of the annotated object. The operation of object alignment can require an image resampling step or process that can be performed by filtering the image by the Gaussian $\sigma_T$ and interpolating tri-linearly. Alternate resampling schemes/processes can be employed in various embodiments.

From each of the aligned digital representations of the object, at a training set gradient computation process/processor 230, discrete gradient approximations along each of the three-dimensions can be computed to form a gradient field. One illustrative technique or process for computing gradients involves computing first-order central finite differences along respective axes. Thus, for each input object representation, an x-dimension gradient sub-image, a y-dimension gradient sub-image, and a z-dimension gradient sub-image are formed. Collectively, for convenience of understanding, the output of this process is referenced as a set of gradient object sub-images 235 that includes a set of n x-dimension gradient sub-images, a set of n y-dimension gradient sub-images, and a set of n z-dimension gradient sub-images, where n corresponds to the number of training images acquired. In digital form, the gradient field can be stored as a single volume (e.g., an array) of vectors and thus, free of an explicit separation of template images into three discrete components.

Figure 2:
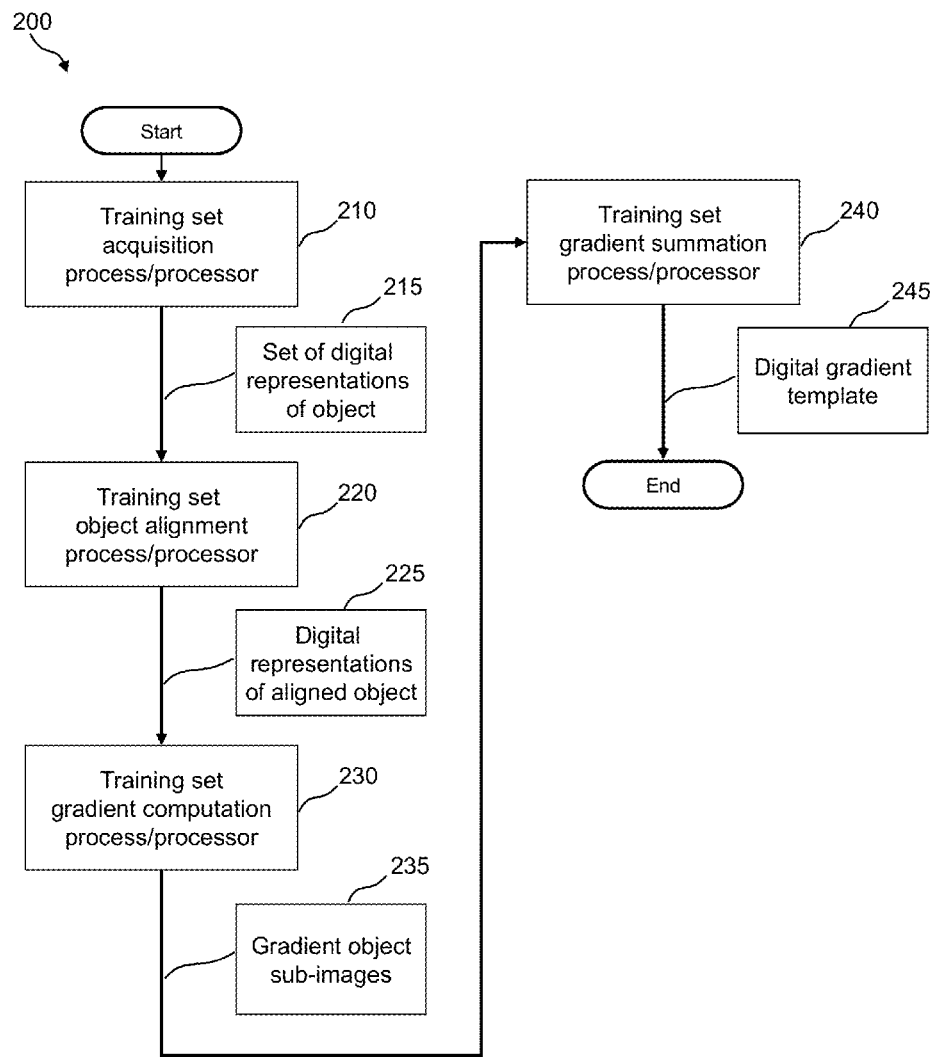
FIG. 2 is a flow diagram of an illustrative process for constructing a gradient template of an object to be detected in accordance with the computer vision system of FIG. 1.

In the last depicted block of FIG. 2, a training set gradient summation process/processor 240 performs summation computations to construct digital gradient template information 245 that can be included as part of the illustrative system 100. By way of a specific example, a gradient field template may be computed according to the following:

$$T(x, y, z) = \begin{cases} w(x, y, z) \cdot \dfrac{\sum_i \nabla_n B_i(x, y, z)}{\left\|\sum_i \nabla_n B_i(x, y, z)\right\|}, & \text{if } (x, y, z) \in \Omega_B \\ 0, & \text{otherwise.} \end{cases} \quad (4)$$

In the formula above, the weight $w(x, y, z)$ is an indicator of relative importance of the location $(x, y, z)$ within the template. It can be set either to 1, making all parts of the template of equal significance, or to the magnitude of the aggregate vector $$w(x, y, z) = \left\|\sum_i \nabla_n B_i(x, y, z)\right\|.$$

In alternative embodiments this weight can be obtained empirically to reflect the relative importance of the individual parts of an organ or other region of interest in a body.

For convenience of understanding, a first summation operation of vectors can be performed using the set of n x-dimension gradient sub-images, a second summation operation of vectors can be performed using the set of n y-dimension gradient sub-images, and a third summation operation of vectors can be performed using the set of n z-dimension gradient sub-images. Each operation can involve traversing a data structure of scalar values that form the respective set and, for each voxel, summing the gradient vectors and, optionally, normalizing by a scalar value.

Figure 1B:
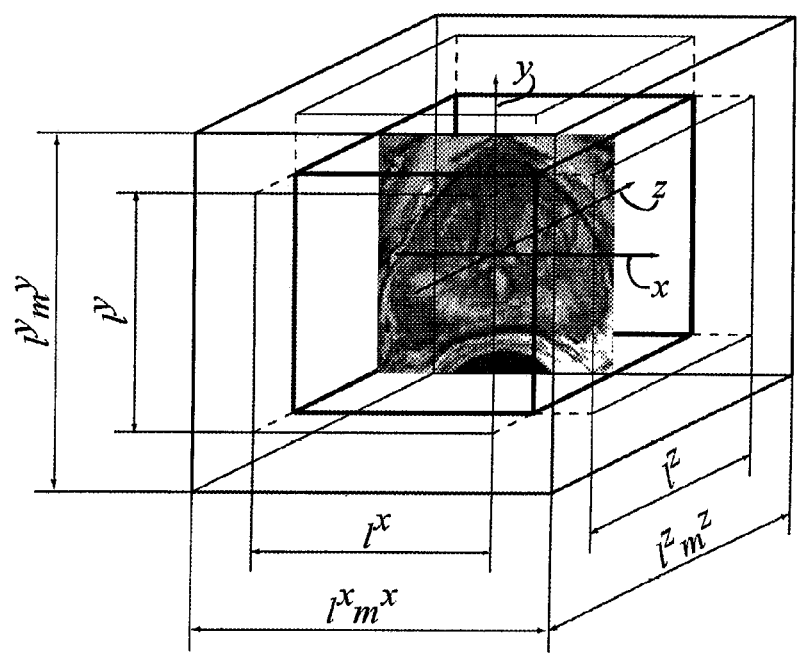
FIG. 1B is a three-dimensional diagram of the boundaries of a matching context for use in the processes/procedures herein.

In the formula above, $\Omega_B$ is the matching context that incorporates the object and the space around it. The bounds of the matching context in three dimensions is shown illustratively in the three-dimensional diagram of FIG. 1B. According to an illustrative embodiment, with recognition that the amount of object boundary included in the template impacts detection accuracy, the context can include all (or substantially all) of the object boundary. By way of specific example and as visually represented in FIG. 3, the margin around the prostate can be parameterized by the value $m=(m^x, m^y, m^z)$. This value, in turn, is employed to scale the dimensions of a prostate bounding box 310:

$$\Omega B = \{(x,y,z): |x| \leq \frac{1}{2} l^x m^x, |y| \leq \frac{1}{2} l^y m^y, |z| \leq \frac{1}{2} l^z m^z\}. \quad (5)$$

Exemplary Prostate Gradient Template

Figure 3:
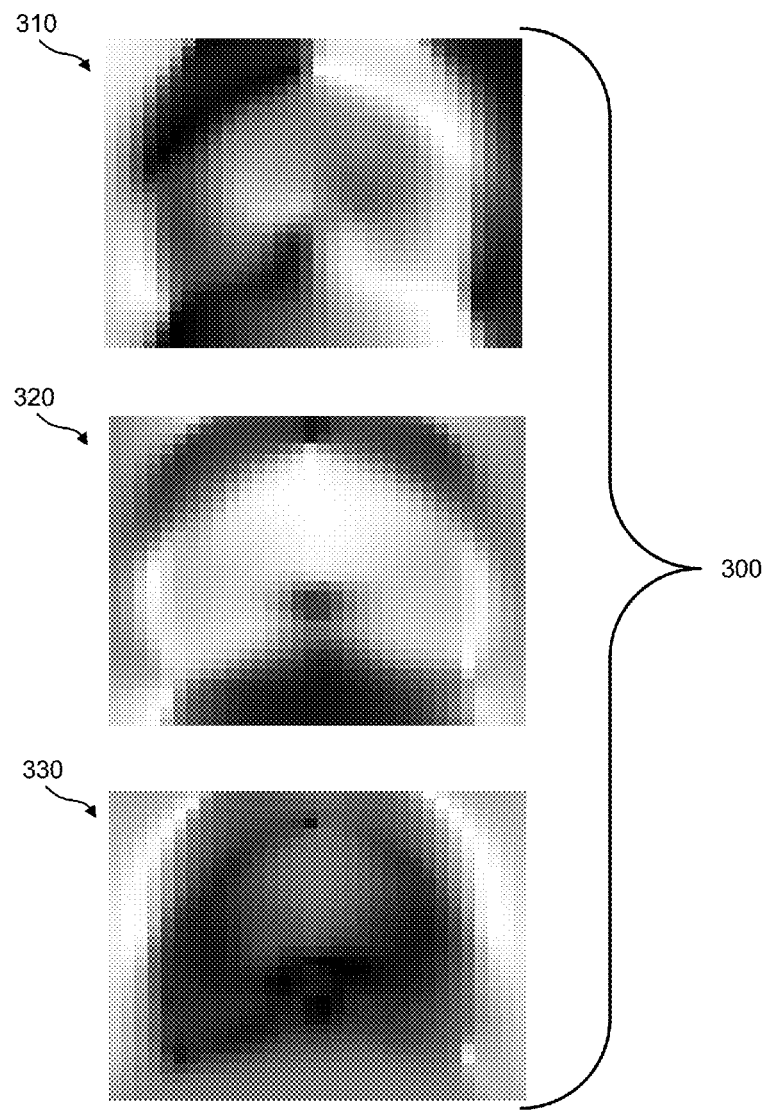
FIG. 3 is an image displaying three template slices of an exemplary gradient template of a prostate gland that was constructed using the process of FIG. 2.

FIG. 3 illustrates the display (for example, on a display screen or screen printout) of a slice of an exemplary gradient template 300 of a pelvic region including a prostate gland that was constructed using the offline process described in FIG. 2. This template is representative or exemplary of one possible template that can be implemented as part of the computer vision system 100 for use in an illustrative embodiment of magnetic resonance imaging prostate detection. The template 300 includes three sub-templates or components 310, 320, and 330, each of which is composed by an array of image elements. Although two-dimensional arrays are shown in FIG. 2, it should be recognized that these arrays are illustrative of various possible arrangements and/or constructs to show gradients computed for a single image slice of the object and each sub-template can be composed of three-dimensional arrays in accordance with three-dimensional imaging. Each image element in a sub-template array contains a scalar value that represents a directional change in MR image signal intensity (i.e., a gradient) of the prostate gland in a single direction.

Each sub-template scalar value statistically defines the expected gradient of the object along a particular dimension at a discrete spatial location. In this example, sub-template 310 illustrates gradients in the x-dimension, sub-template 320 illustrates gradients in the y-dimension, and sub-template 330 illustrates gradients in the z-dimension.

Exemplary Gradient Template Matching Procedure

Figure 4:
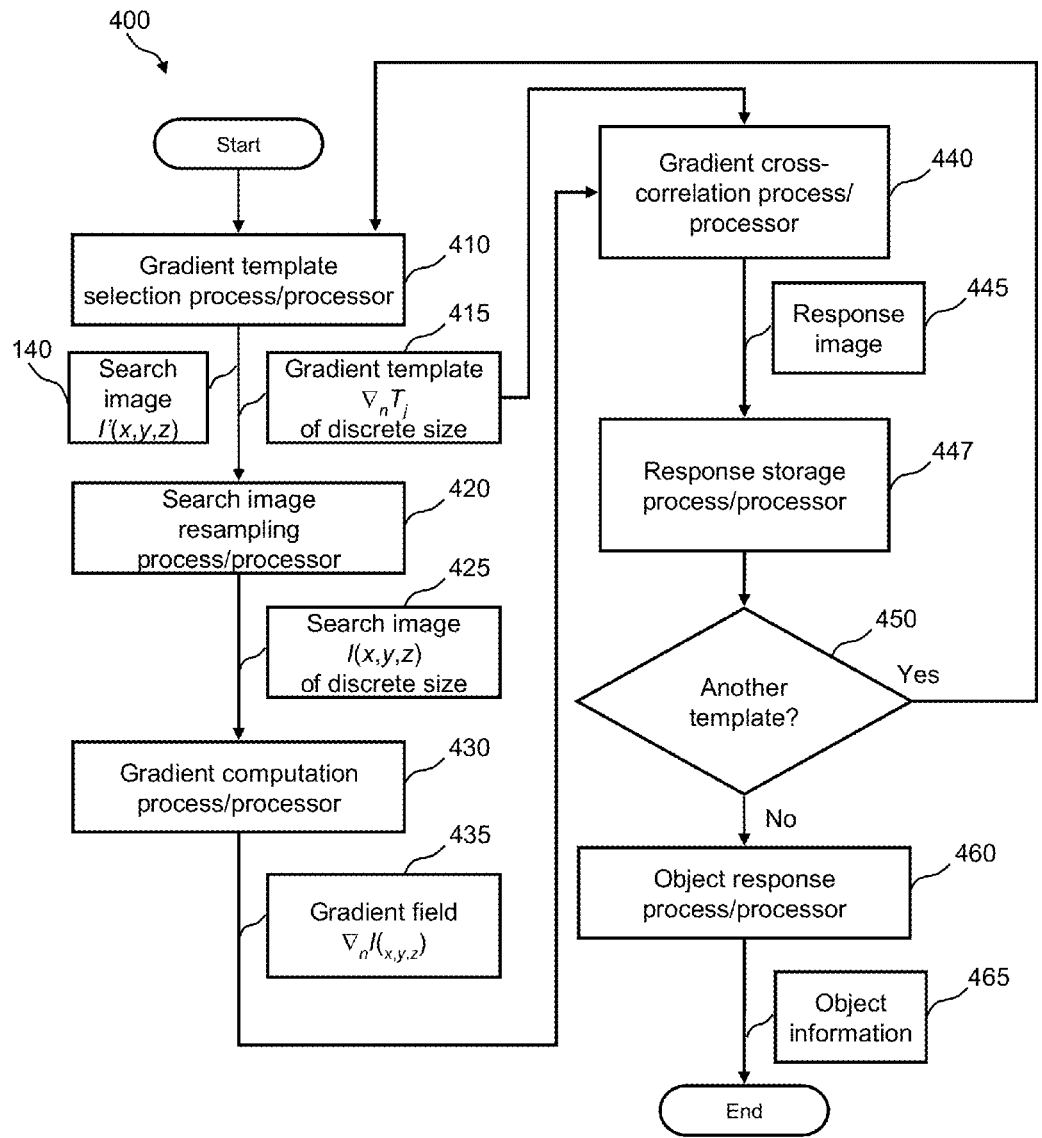
FIG. 4 is a flow diagram of an illustrative gradient template cross-correlation process that can be performed by the computer vision system of FIG. 1.

Now referring to FIG. 4 and with continuing reference to FIG. 1, there is illustrated an embodiment of a template matching process 400 that can be performed by the gradient template matching process/processor 135 at runtime to detect the object of interest in the search image 140.

As described herein above, according to an illustrative embodiment, the digital gradient template information 125 can include information about the object at a plurality of discrete scales. Accordingly, certain steps of the process 400 can be performed in a looping procedure using digital gradient template information corresponding to a particular scale. Illustratively, each time the process loop returns to a gradient template selection process/processor 410, a discretely sized gradient template 415 of the object, denoted as $T_j$, can be loaded from storage into memory for processing. Here j denotes an index of the template. Alternatively, the process can be performed once if only a single template is available for matching.

Next, a search image resampling process/processor 420 can be executed in which the search image 140 $I'(x, y, z)$ is resampled to match the resolution of the selected gradient template $T_j$ 415. An output from such a process is a search image $I(x, y, z)$ 425 that matches the discrete size of the gradient template. Illustrative details for performing such a step can include selecting the resolution of the template, in turn, such that the physical size of the template is equal to the average size of the subject organ or other region of interest that is imaged. If a mean size s of an organ bounding box encountered in the training set is denoted as $s=(s^x, s^y, s^z)$, the pixel spacing of the template can be computed as follows:

$$r_T^x = s^x/(l^x-1), \quad r_T^y = s^y/(l^y-1), \quad r_T^z = s^z/(l^z-1) \quad (6)$$

As described herein above, $l^x$, $l^y$ and $l^z$ denote the size of the organ bounding box used to construct the gradient template in a training or offline process. Alternatively, the pixel spacing of the template can be specified manually. A mapping between original search image I' and resampled search image I can take the form:

$$I(x, y, z) = I'\left(\frac{r_T^x}{r_{I'}^x}x, \frac{r_T^y}{r_{I'}^y}y, \frac{r_T^z}{r_{I'}^z}z\right). \quad (7)$$

Illustratively, the operation can require image resampling, which is performed by filtering the image by the Gaussian $\sigma_1$ and interpolating trilinearly.

At a gradient field computation process/processor 430, individual x-, y-, and z-dimension gradient field components can be extracted from the resampled search image $I(x, y, z)$ 425. First-order central finite differences can be computed. Collectively, the x-dimension gradient field $(\nabla_n I)_x$, the y-dimension gradient field $(\nabla_n I)_y$, and the z-dimension gradient field $(\nabla_n I)_z$ components form a magnitude normalized gradient field $\nabla_n I$ 435.

Then, the magnitude normalized gradient field $\nabla_n I$ 435 and the gradient template 125 $T_j$ can be cross-correlated as part of a gradient cross-correlation process/processor 440 to produce a response image 445 $\nabla_n I * T_j$; according to equation (1). The response image 445 quantifies correlation of the gradients.

Illustratively, an efficient technique/process for implementing the cross-correlation is to use the cross-correlation theorem and move the computation to the frequency domain, as is known to one of skill in the art. In such embodiments, a frequency domain representation of each gradient template(s) 125 can be stored and used by the computer vision system. Accordingly, at runtime, the search image gradients must be transformed to the frequency domain as well. One illustrative transformation is the Fast Fourier Transform (FFT).

In embodiments that employ templates of various discrete sizes, cross-correlation information computed for the template under processing, such as the optimal displacement and the highest response for the template, can be stored in a computer memory. This process is represented by a response storage process/processor 447.

In accordance with a logical decision process/processor 450, the process 400 can return to the gradient template selection process/processor 410 as described herein above until cross-correlation information has been generated from cross-correlation of each gradient template with the search image 425. If the image resolution of the current template is equal to the one from the previous iteration, search image resampling 425 and gradient computation 430 may be skipped as they would produce the identical outcome.

In the last depicted step, the discretely sized digital gradient template that produces a response image characterized by the maximum response in the response storage 447, denoted herein by index k, can be illustratively isolated for object detection by a gradient cross-correlation response analysis process/processor 460. The process can also determine the best displacement $\delta_{best}$ across all templates as resulting in the maximum of the gradient cross-correlation function in accordance with the formula:

$$(k, \delta_{best}) = \underset{(j,\delta)}{\mathrm{argmax}} \frac{1}{M(T_j)} (\nabla_n I * T_j)(\delta). \quad (8)$$

where $M(T_j)$ represents a normalization of the template by its aggregate magnitude that may be computed in accordance with the formula:

$$M(T_j) = \sum_{(x,y,z) \in \Omega_B} \|T_j(x, y, z)\|. \quad (9)$$

Note that if the magnitude of the template gradient is constant an equal to 1, the value of $M(T_j)$ is proportional to the volume of the template.

The response process/processor 460 can also computationally approximate the size of the detected prostate from the values of parameters $l^x$, $l^y$ and $l^z$ associated with template k. Outputs such as the best displacement and the size are collectively illustrated as the object position or localization information 465 (also referenced generally as Object detection information 155 in FIG. 1).

Figure 5:
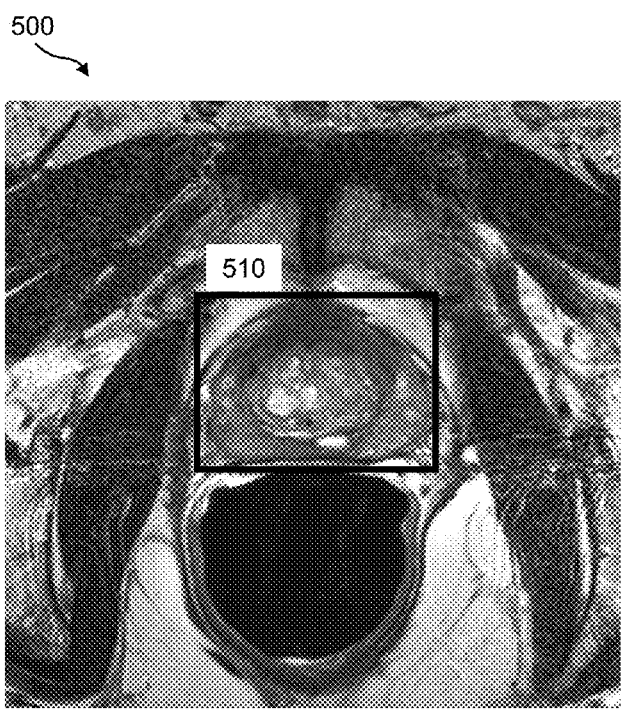
FIG. 5 is an image displaying a slice of an exemplary grayscale magnetic resonance (MR) image of a body region showing prostate object information computed by the computer vision system and corresponding processes/procedures of FIG. 1.

FIG. 5 illustrates the display (for example, on a display screen or screen printout) of a slice of an exemplary grayscale magnetic resonance (MR) image 500 of a pelvic region including a prostate showing how object information computed by the computer vision system of FIG. 1 can be utilized to localize the prostate. In this example, the information has been used to determine a tight bounding box 510 around the organ, which has been annotated on the grayscale output image for illustrative purposes. In this example, the prostate region has been distinguished from anatomical background, thereby removing irrelevant regions that might otherwise interfere with key prostate features. This makes the bounding box representation more meaningful and easier to analyze than the original search image.

Exemplary Post-Processing Steps

After detection of the object in accordance with the principles presented herein above, additional post-processing steps can be performed to further refine the geometrical description of the object in the image. One particular object shape initialization method involves performing a translation and a scaling of a pre-computed, digital representation of the entire surface of the organ of interest to a three-dimensional bounding box localized by employing the novel concepts and principles of the illustrative embodiments. Illustratively, the digital representation of the surface can be stored in the form of a conventional triangular mesh, for example. Other illustrative post-processing steps can include: (a) iteratively refining the digital representation of the object surface and, (b) in the example of imaging the prostate, classifying voxels as either part of the central gland or non-central gland using features (e.g., location, relative image intensity).

Illustrative Evaluation of the System and Method and Results Thereof

The following is a description of an exemplary evaluation process used to test the performance of an illustrative embodiment as it relates to the localization of the prostate in magnetic resonance images.

In accordance with the exemplary gradient template construction process, a set of 261 axial, T2-weighted MRI images of a human prostate (magnetic field 3.0 Tesla, typical spacing 0.27×0.27×3.00 mm, typical size 512×512×26 pixels) were provided by the National Institutes of Health. Every image had a prostate axially contoured by a radiologist-trained fellow. This set was split into two non-overlapping subsets containing 131 and 130 images based on parity of the numerical image identifier. The first subset was used to construct the prostate template, while the second subset was used for the algorithm validation.

In the exemplary baseline experiment, the template context margin was chosen to be isotropic and empirically set to $m^x=m^y=m^z=0.2$. To account for natural prostate size variation, nine (9) templates were constructed, with an incrementally increasing size of $l_j^x=l_j^y=l_j^z=32(0.1j+1)$ pixels, where $j=\{-4, -3, -2, -1, 0, +1, +2, +3, +4\}$ and $j=0$ corresponds to average prostate size. In order to avoid resampling the image 9 times, the spacing for all templates was selected to be the same, and determined given the average physical size and pixel base size $l_0^x=l_0^y=l_0^z=32$ using Equation 6. Illustratively, templates have been computed "offline" and stored on disk in this example.

Prostate detection sensitivity was measured on the validation set as a fraction of automatically determined centroid "hits" to the number of images in the evaluation set. "Hit" is a situation in which the automatically determined centroid is located inside the manually-produced prostate contour.

Prostate localization accuracy was measured as mean and median distances between the automatically determined centroid and the centroid of the smallest rectangular box bounding the prostate and having the faces parallel to respective image planes.

Average execution time for the method involving resampling and computing cross-correlation with 9 templates in frequency domain was also measured.

The method resulted in prostate detection sensitivity of 1.0 (no failures were observed). The mean and median distances to bounding box centroids were 4.13 mm (millimeters) and 3.23 mm, ranging from 0.32 to 16.89 mm. The average execution time varied from 2.5 to 5 seconds depending on the image processing device (e.g., workstation) configuration, representing an efficient processing time with desirable results.

It has been recognized that the template resolution and the standard deviation values of the Gaussians $\sigma_T$, and $\sigma_I$ used to smooth the template and search image, respectively, can be chosen empirically to minimize localization error. For example, values of $\sigma_T=3.0$ mm and $\sigma_I=5.0$ mm were selected as the optimal, since they resulted in both lowest mean and lowest maximum error in localization for a 32 pixel based prostate template.

Exemplary Medical Image Acquisition Scanner

The medical image acquisition scanner or device 110 can utilize any number of biomedical imaging technologies to create three-dimensional medical images 140 of the object of interest for detection. For example, scanners employing magnetic resonance imaging (MRI) technology are typically known to those of skill in the art, and have been previously described in, for example, U.S. Pat. No. 7,620,227 and "Breast MRI: Fundamentals and Technical Aspects," R. Edward Hendrick, Springer Science and Business Media, 2008, ISBN: 978-0-387-73506-1, the teachings of which are incorporated herein by reference as useful background information.

Exemplary Template Storage Architectures

One of skill will recognize numerous architectures suitable for the storage device 120 that retains digital templates 125 to be used for object detection by the computer vision system. By way of one non-limiting example, the storage device can be a Picture Archiving and Communication System (PACS) capable of storing, retrieving, and distributing medical image data between components of the computer vision system 100. Alternatively, any directly attached or networked storage device with appropriate data organization can be employed to store, and allow retrieval of, the image data. For example, the storage device can comprise a removable disk or solid-state storage, a network-attached-storage appliance, a storage area network (SAN) and/or a remote data store accessed by a secure private network, such as a hospital wide area network or a public network. Appropriate layers of encryption can be applied to the transmitted as well as the stored data as required to satisfy various governmental and institutional security requirements. Such encryption techniques should be clear to those of ordinary skill.

Although the storage device 120 is illustratively shown as a separate component from the medical image processing device 110, the medical image processing device can, alternatively, house the storage device.

Exemplary Medical Image Processing Device

The medical image processing device 110 is also referred to herein as a medical image processing or review apparatus/system/workstation, or more generally a digital computer (e.g. a general purpose PC or a purpose-build processing device), capable of executing image processing instructions on medical image data in accordance with an illustrative embodiment. Exemplary instructions can include, but are not necessarily limited to, the illustrative gradient template cross-correlation process 400 and associated sub-procedures described herein above in this disclosure, and denoted generally by the gradient template matching process/processor block 135. Such instructions can be realized by suitable combinations of hardware and software components of the medical image processing device 110 such as, but not necessarily limited to, microprocessors, digital signal processors (DSPs), field-programmable gate arrays (FPGAs), main memories, secondary/auxiliary memories, input/output devices, operating system software, application software, etc. Any such functions, either entirely or in part, can be further implemented on a non-transitory computer-readable medium/media, which can operate in conjunction with the image processing device to achieve the desired objectives presented herein. Also, while the process functions are assigned to discrete process/processor blocks by way of illustration, it is expressly contemplated that functions of various blocks can be consolidated, expanded to further processor blocks, or reordered between blocks as appropriate to carry out the overall process described herein. More generally, such structures and/or functions are herein referred to as "process/processor" as they can be implemented as physical processing structures and/or as functions within a more general processing device, such as a general purpose computer or other software-instruction processing unit.

Exemplary Output Device

To enable digital representations of the object and object information computed by the computer vision system to be provided to a human operator, the output device 150 can be operatively connected to the medical image processing device 110 and/or the storage device 120. The output device can comprise a printer, a computer monitor, a series of computer monitors, and/or other suitable signal output devices of conventional or novel design. The output device allows for presentation of medical images for visual inspection of the object of interest.

It is expressly contemplated that components of the computer vision system 100 can connect to, and communicate with, each other via one or more of any type or combination of types of communication interfaces, including but not limited to physical interfaces, network interfaces, software interfaces, and the like. The communication can be implemented using a physical connection, or it can be wireless, optical, or another modality. Alternatively, images can be transmitted indirectly by use of transportable storage devices (not shown in FIG. 1) such as but not limited to compact discs (CDs), digital video discs (DVDs), or solid state "flash" drives, in which case readers for said transportable storage devices can function as communication interfaces of the system.

CONCLUSION

The foregoing has been a detailed description of illustrative embodiments of the invention. It should be clear that the illustrative embodiments provide sensitive and computationally efficient techniques for recognition of anatomical objects with complex shape characteristics. Thus, various modifications and additions can be made without departing from the spirit and scope of this invention. Each of the various embodiments described above can be combined with other described embodiments in order to provide multiple features. Furthermore, while the foregoing describes a number of separate embodiments of the system and method of the present invention, what has been described herein is merely illustrative of the application of the principles of the present invention. For example, a variety of additional pre-processing, post-processing or contemporaneous processing procedures can be applied to image datasets to render it more readily processed and/or usable by substantive steps. Some or all of the processes described herein can be implemented in hardware, software, including a non-transitory computer-readable medium of program instructions. While certain medical images of certain body regions have been presented to illustrate various aspects of the illustrative embodiments, such medical images should not be construed as limited the utility of the present invention to any one particular organ of interest, nor should such images be construed as limiting the utility of the present invention to images acquired with one particular type of medical imaging technology or scanner. In addition to the exemplary prostate described above, the illustrative embodiments contemplated herein can also be utilized to detect a wide range of organs such as, but not limited to, a liver, a kidney, a bladder, a pancreas, etc. Furthermore, the invention can be utilized to detect a portion of an organ of interest, such as a lung lobe or a prostate apex. Also, as used herein, the term "signal" should be taken broadly to include various image data that is stored, transmitted and/or displayed, which embodies such properties, and is not limited to transmitted electromagnetic waves. Examples of such properties embodied by the signals, signal information, or image data include intensity and/or color, which are typically defined as one or more digital values within a given range (for example, grayscale intensity between 0 and 255, or discrete RGB values each between 0 and 255). Accordingly, this description is meant to be taken only by way of example, and not to otherwise limit the scope of this invention.

What is claimed is:

1. A system for localizing a region of interest in a search image of at least a portion of a body comprising:
a gradient template generated prior to a runtime based upon an expected image property of the region of interest; and
a localization process/processor that, based upon the gradient template and during the runtime, identifies the region of interest and provides search image data that identifies portions of the region of interest;
wherein the localization process/processor is based upon a cross-correlation of normalized gradient fields corresponding to the search image of the body and the gradient template.

2. The system as set forth in claim 1 wherein the gradient template is based upon image properties in the region of interest within established boundaries around the region of interest.

3. The system as set forth in claim 2 wherein the region of interest is an organ.

4. The system as set forth in claim 3 wherein the organ is a prostate.

5. The system as set forth in claim 1 wherein the medical image includes image data acquired from a magnetic resonance imaging (MRI) device that images the body.

6. The system as set forth in claim 5 wherein the region of interest is an organ.

7. The system as set forth in claim 1 wherein the localization process/processor includes a segmenting process/processor that segments a representation of a boundary of the region of interest in response to results of a cross correlation computation.

8. The system as set forth in claim 1 wherein the medical image is characterized by intensity invariance.

9. The system as set forth in claim 8 wherein the medical image comprises a MRI-based image.

10. The system as set forth in claim 1 wherein the region of interest defines a pelvic region and a prostate.

11. The system as set forth in claim 1 wherein the gradient template includes a plurality of template components defined in three dimensions.

12. The system as set forth in claim 11 wherein the plurality of template components include an x-dimension template component, a y-dimension template component and a z-dimension template component.

13. The system as set forth in claim 1 wherein the gradient template includes at least one of (a) a plurality of boundary gradients with respect to an organ and (b) boundary gradients that enclose an organ boundary.

14. The system as set forth in claim 1 wherein the gradient template is constructed and arranged to characterize an organ at a plurality of discrete scales.

15. The system as set forth in claim 14 wherein the discrete scales include discrete aspect ratios.

16. The system as set forth in claim 1 further comprising an output process/processor that outputs a visual representation of a detected and localized organ to a display.

17. A method for localizing a region of interest in a search image of at least a portion of a body comprising the steps of:
 providing, prior to a runtime, a stored gradient template based upon an expected image property of the region of interest; and
 detecting and localizing, based upon the gradient template and during the runtime, the region of interest and provides search image data that identifies portions of the region of interest;
 wherein the step of detecting and localizing includes cross-correlating normalized gradient fields corresponding to the search image of the body and the gradient template.

18. The method as set forth in claim 17 wherein the region of interest is an organ.

19. The method as set forth in claim 18 wherein the organ is a prostate.

20. The method as set forth in claim 17 wherein the medical image includes image data acquired from a magnetic resonance imaging (MRI) device that images the body.

21. The method as set forth in claim 1 further comprising segmenting a representation of a boundary of the region of interest in response to results of a cross correlation computation.

22. The method as set forth in claim 17 wherein the medical image is characterized by intensity invariance.

23. The method as set forth in claim 22 wherein the medical image comprises a MRI-based image.

24. The method as set forth in claim 17 wherein the region of interest defines a pelvic region and a prostate.

25. The method as set forth in claim 17 wherein the step of providing the gradient template includes defining a plurality of template components defined in three dimensions.

26. The method as set forth in claim 25 wherein the plurality of template components include an x-dimension template component, a y-dimension template component and a z-dimension template component.

27. The method as set forth in claim 17 wherein the gradient template includes at least one of (a) a plurality of boundary gradients with respect to an organ and (b) boundary gradients that enclose an organ boundary.

28. The method as set forth in claim 17 wherein the gradient template characterizes an organ at a plurality of discrete scales.

29. The method as set forth in claim 28 wherein the discrete scales include discrete aspect ratios.

30. The method as set forth in claim 17 further comprising outputting a visual representation of a detected and localized organ to a display.

31. A non-transitory computer-readable medium including program instructions comprising:
 a data structure that includes one or more image gradient templates generated prior to a runtime with respect to at least one organ that is subjected to medical imaging; and
 an image-processing procedure that, during the runtime, employs the data structure to derive information about the at least one organ from image data by cross-correlating normalized gradient fields corresponding to a search image of the at least one organ and the one or more image gradient templates.

32. The computer-readable medium as set forth in claim 31 wherein the image-processing procedure is constructed and arranged to detect and localize the organ in the image data.

33. The computer-readable medium as set forth in claim 32 wherein the image-processing procedure is constructed and arranged to segment a representation of a boundary of the organ based upon results of cross-correlating.

34. A method for localizing an organ in a medical image of at least a portion of a body comprising the steps of:
 providing a plurality of stored gradient templates based upon an organ prior to a runtime;
 receiving the medical image; and
 detecting the organ in the medical image, during the runtime, based upon at least one of the gradient templates in the plurality of gradient templates that produces a maximum cross-correlation with normalized gradients in the medical image.

35. The method as set forth in claim 34 wherein the organ comprises a prostate.

36. The method as set forth in claim 34 further comprising outputting a visual representation of a detected organ to a display.

37. The system as set forth in claim wherein the gradient template is normalized.

* * * * *